United States Patent [19]
Richards

[11] 4,000,719
[45] Jan. 4, 1977

[54] AUTOMATIC PET FEED DISPENSER

[76] Inventor: Gary H. Richards, 3204 Palm Ave., Manhattan Beach, Calif. 90266

[22] Filed: Apr. 30, 1975

[21] Appl. No.: 572,963

[52] U.S. Cl. .............................. 119/51.13; 119/51.5
[51] Int. Cl.² ........................................ A01K 5/02
[58] Field of Search ......... 119/51.13, 51.11, 51.14, 119/51.5, 53, 56 R, 51, 56, 51.12; 222/70, 370, 354, 63, 168.5; 141/147; 221/86, 121, 8

[56] References Cited
UNITED STATES PATENTS

| 261,441 | 7/1882 | Goodpasture | 222/354 |
|---|---|---|---|
| 616,124 | 12/1898 | Likins | 222/354 |
| 628,201 | 7/1899 | Keller | 222/354 |
| 746,571 | 12/1903 | Powell | 222/354 |
| 2,500,243 | 3/1950 | Dixon | 119/51 R |
| 3,208,431 | 9/1965 | Kloss | 119/51.11 |
| 3,726,438 | 4/1973 | O'Rourke | 119/51.13 |
| 3,741,162 | 6/1973 | Lopez | 119/51.13 |
| 3,955,537 | 5/1976 | Yujiri | 119/51.13 |

Primary Examiner—Robert Peshock
Assistant Examiner—Peter K. Skiff
Attorney, Agent, or Firm—Lindenberg, Freilich, Wasserman, Rosen & Fernandez

[57] ABSTRACT

An automatic pet feed dispenser is provided in the form of a feed drum rotated about a vertical spindle by a motor. The drum is divided into bins by vertical radial panels between a hub and the drum. Each bin is closed at the bottom by a hinged sector panel held in a horizontal position by a support panel having a sector shaped opening over a chute. The hinged sector panels drop as they move into place over the chute which directs dry feed into a tray. At the same time preheated water is added to the feed tray from a metering chamber. A cam actuated switch turns on a thermostat controlled heater and a cam operated valve drains the water into the tray. A float valve refills the metering chamber from a reservoir.

4 Claims, 7 Drawing Figures

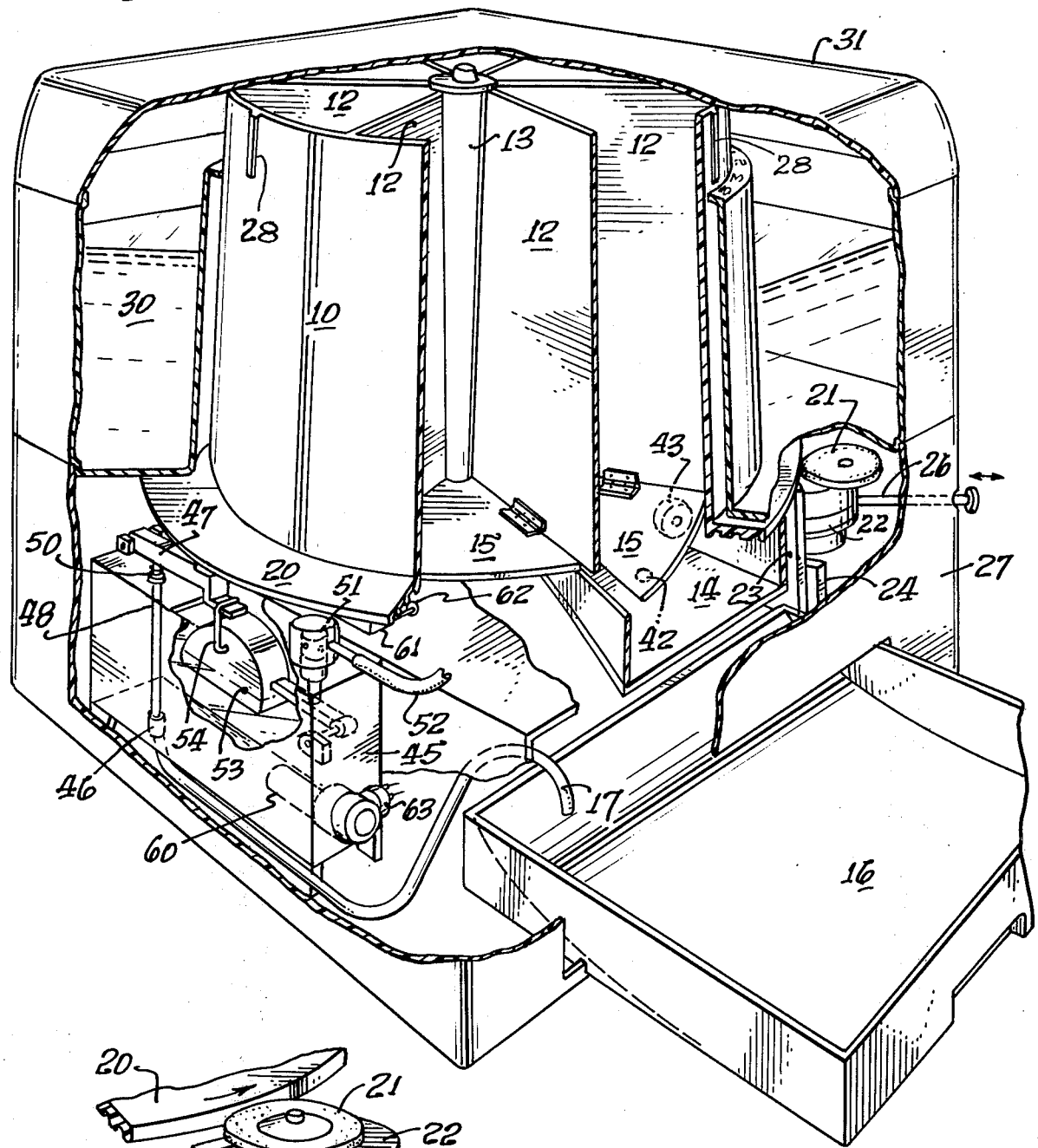

AUTOMATIC PET FEED DISPENSER

BACKGROUND OF THE INVENTION

This invention relates to apparatus for dispensing pet feed, and more particularly to apparatus for automatically dispensing pet feed at regular intervals over a predetermined time span.

It is frequently necessary to leave a pet unattended, such as for a full day and late into the evening or overnight, or even over a weekend. The usual practice is to have a friend or neighbor look in on the pet and dispense feed at the proper time or at regular intervals. It would be desirable to have an automatic system for dispensing pet feed at predetermined intervals.

SUMMARY OF THE INVENTION

In accordance with the broadest aspects of the present invention, a storage drum rotated on a vertical spindle is divided into a number feed storage bins by radial panels between a hub and the drum. Each bin is closed at the bottom by a side-hinged sector panel held in a horizontal position by a support panel having a sector-shaped opening over a chute. Each sector-shaped panel drops when it reaches the opening over the chute. Dry granular feed then drops through the chute into a feed tray below. The feed tray is preferably shaped with a bottom panel that slopes downwardly and outwardly from an upper edge on one end of the tray under the chute to a lower edge on the opposite end of the tray. Each sector panel is provided with a rounded protrusion which rides on the support panel to reduce friction as the storage drum is rotated. The support panel functions as a reclosing cam for the sector panels of the bins. A small roller mounted on a fixed shaft in the dispenser chute at the far end relative to the direction of rotation of the drum reduces friction of the sector panel against the dispenser chute as the panel is forced back to its closed position as the drum continues to rotate. A small motor provides the power to rotate the drum. To add water to the dry feed, a cam actuated valve drains a metering chamber into the feed tray as the drum is rotated to a position where a sector panel of a bin drops. Following that the drain valve is closed as the drum continues to rotate and a float actuated valve refills the chamber from a water reservoir. A cam actuated switch turns on in electrical heating element to heat the water in the metering chamber moments before the water is drained into the feed tray. A thermostat switch turns the heater off at the desired temperature. The cams for the heater switch and drain valve are disposed on a flange connected to the outside of the drum. Two chutes may be arranged to dispense feed into separate trays at the same time from separate bins with water added to each from the same or separate metering chambers.

BRIEF DESCRIPTION OF THE DRAWINGS

FIG. 1 is a perspective view, partially broken away of a preferred embodiment of a pet feed dispenser according to the present invention.

FIG. 2 is a perspective view illustrating the manner in which a motor driven wheel engages a rim of a carousel feed drum of the feed dispenser shown in FIG. 1.

DESCRIPTION OF THE PREFERRED EMBODIMENTS

Figure 3:
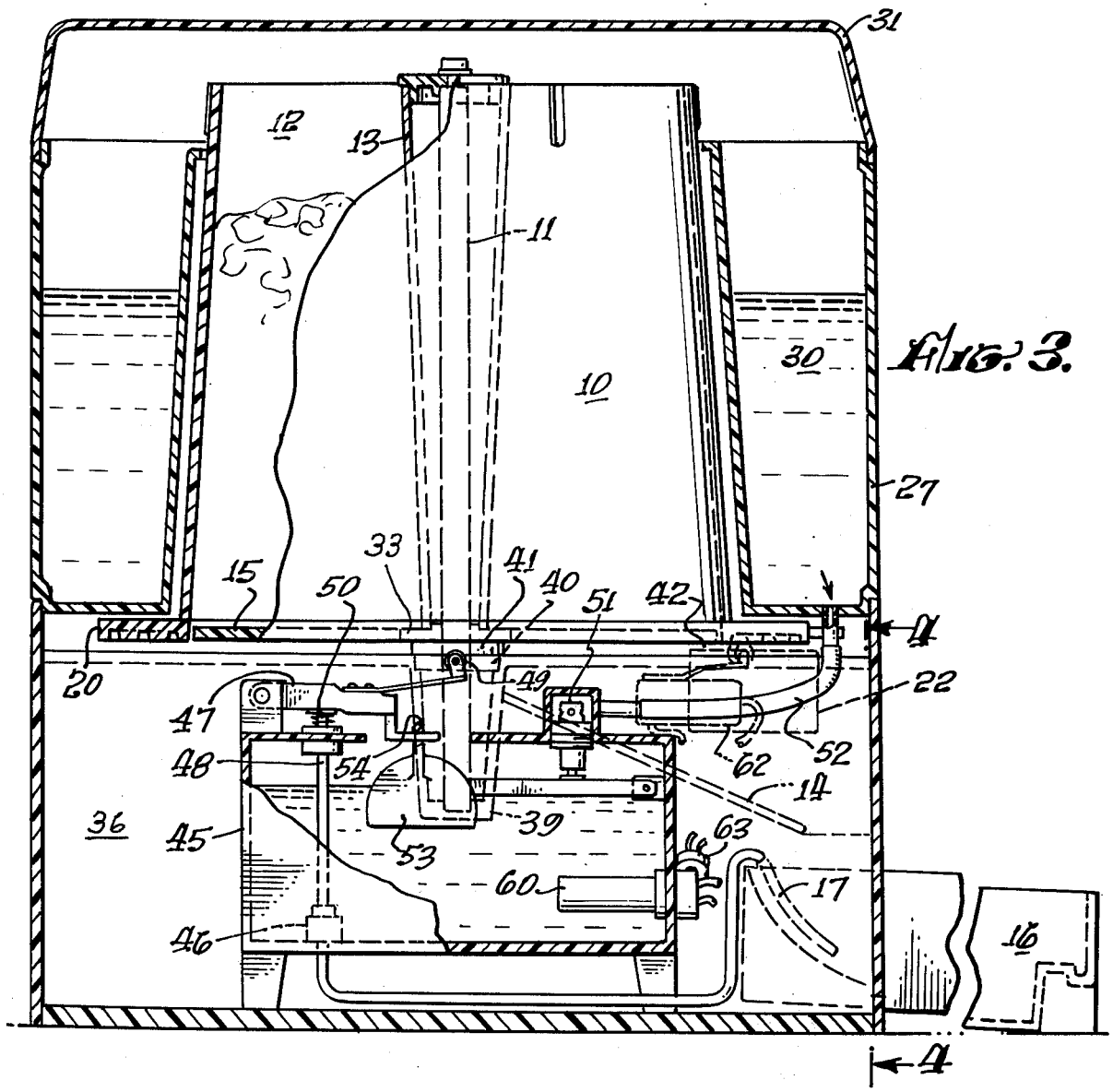
FIG. 3 is a side view partially broken away of the pet feed dispenser of FIG. 1.

Referring to the drawings, and particularly to FIG. 1, a carousel storage drum 10 revolves about a spindle 11. The drum is divided into a number of feed storage bins by radial panels 12. The drum is of larger diameter at the bottom than it is at the top while a hub 13 is of smaller diameter at the bottom than at the top so that dry feed stored in each bin formed by the radial panels in the drum will readily drop into a feed chute 14 when a side-hinged sector panel 15 falls into the space of the chute as the drum rotates into proper position. The feed is directed by the chute into a tray 16 having a bottom which slopes from the upper inside edge of the tray downwardly and outwardly from under the chute to assure that dry feed falling from the chute will progress toward the end of the tray remote from the chute. At the same time water is added to the dry feed through a flexible tube 17, as will be described more fully hereinafter with reference to FIG. 3.

Figure 5:
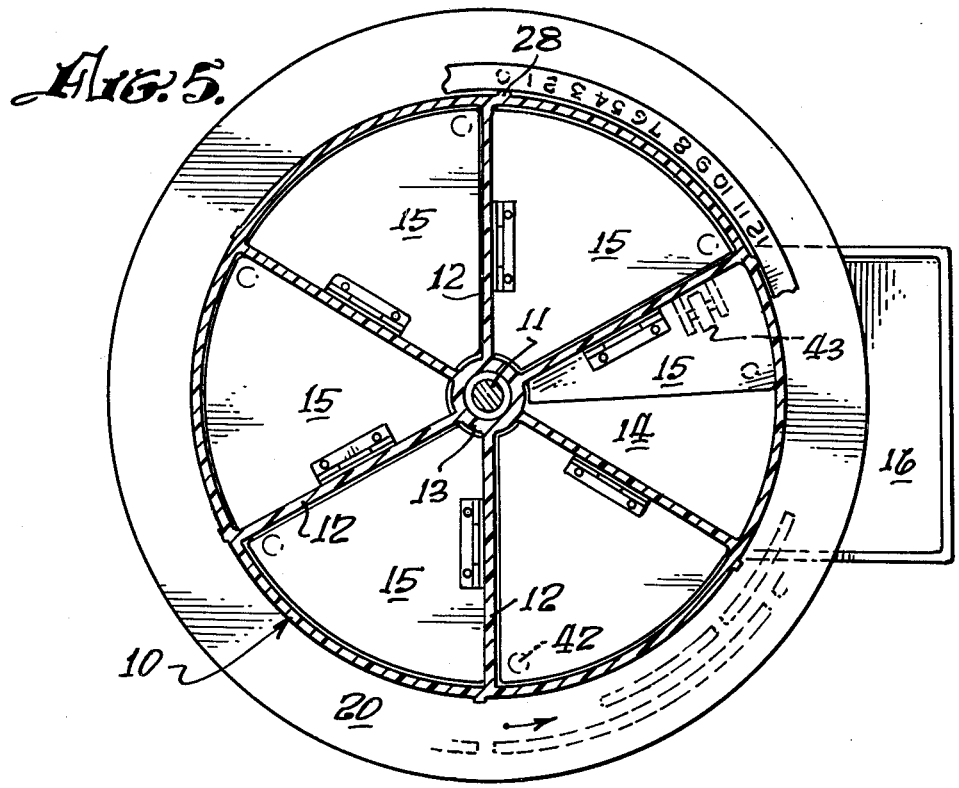
FIG. 5 is a top view of the carousel feed drum and rim over a support plate and dispensing chute of the feed dispenser of FIG. 1.
Figure 6:
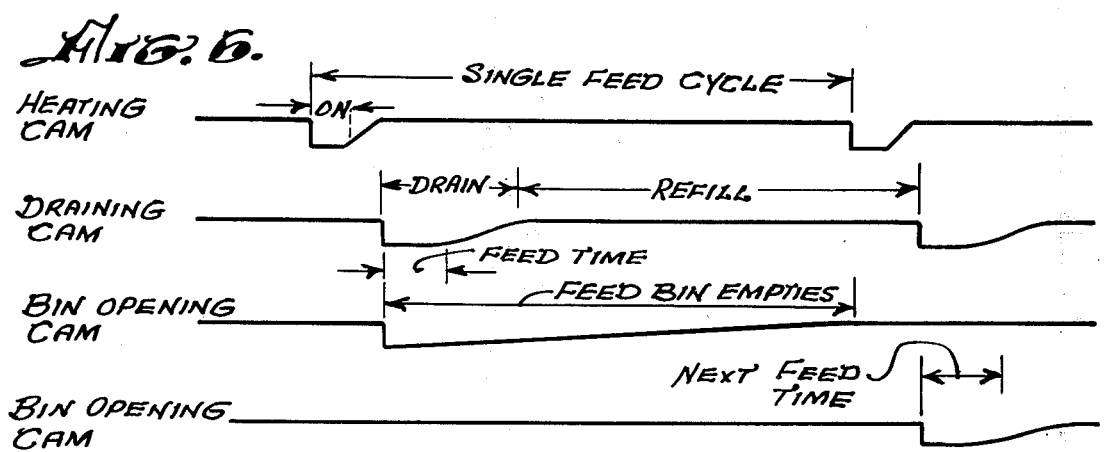
FIG. 6 is a timing diagram for cam actuated heater switch and drain valve for a water metering chamber in the feed dispenser of FIG. 1, and for cam actuation of drop sector panels in the carousel feed drum.

The drum 10 has a flange 20 connected to its lower outside edge. Programming cams are fixed underneath the flange for the timing of preheating and dispensing water into the tray. The cams are indicated generally by dotted lines in the top view of the drum shown in FIG. 5, and the timing provided by the cams is shown in FIG. 6. The indicated timing functions are carried by the cams through cam followers as the feed drum is rotated by a drive wheel 21. The drive wheel is rotated at a constant RPM by an electrical motor 22.

The motor 22 is supported on a panel 23 pivoted about a horizontal axis as shown in FIG. 2. A spring 25 between the pivoted panel and a fixed backstop 24 biases the drive wheel 21 against the flange 20 of the feed drum with sufficient force to maintain non-slip contact between the drive wheel and the drum flange. A rod 26 connected to the motor protrudes through a housing 27 in order to permit the motor and wheel to be pulled away from the flange against the spring bias while the drum is freely rotated to set the starting time for a feeding cycle, or to lift the feed drum out for cleaning once a water reservoir 30 and cover 31 have been lifted off the housing 27. In that regard, it should be noted that the reservoir is supported solely from the outside edges of the housing so that the feed drum and the flange can turn freely on the spindle 11 while the reservoir is in place.

The outside wall of the reservoir is substantially square in the exemplary embodiment, but may be rectangular, or of any other configuration selected for the housing 27. The inside wall is substantially annular, but with a larger diameter at the bottom than at the top to conform to the shape of the feed drum, which is the shape of a frustum of a cone. The upper end of the inside wall is turned in to provide a flange on which numbers may be printed to show the time in hours until the next feeding time. (See also FIG. 5.) An index mark 28 on the outside of the feed drum at the leading edge of each bin will indicate the time to the next feeding. When an index mark reaches a position opposite the numeral 0 as shown in FIG. 5, a hinged sector panel 15 is then in a position directly over the chute 14 and will drop to dispense the dry feed in the bin.

A feeding occurs each time a hinged sector panel drops into the chute 14 as the motor driven wheel 21 continues to rotate the drum. To double the time between each feeding from, e.g., from 12 to 24 hours, only alternate feed bins would be filled with dry feed. Alternatively, in order to have the ability to dispense feed every 24 hours over a six day period, the drive wheel 21 may be changed to one of smaller diameter such that the motor will turn the drum at half the rate. In that event, the numerals indicating the time to the next feeding would be in units of 2 hours.

FIG. 3 shows the manner in which the reservoir 30 supported by the housing 27 without coming in contact with the drum 10 or its flange 20. The hub 13 of the drum is centered on the spindle 11 by a disc 33 from which unitary ribs radially extend to the flange 20 like spokes of a wheel, one rib under each of the radial panels 12. In practice, the radial panels 12, flange 20, and feed drum 10 may be molded in one part, or in separate parts, and then assembled. The disc 33 would then be added as a separate piece.

Figure 7:
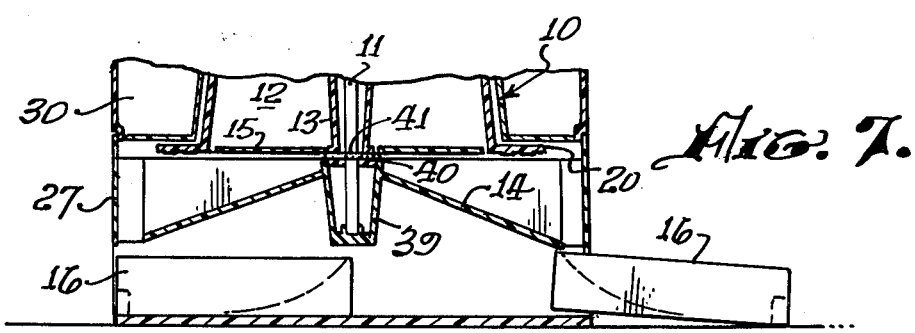
FIG. 7 is a sectional view taken through the center of a pet feed dispenser made according to the invention to show an arrangement for automatic feeding into two trays.

The spindle 11 is supported on a bridge (FIG. 4) comprising side support panels 36 and 37, and a horizontal panel 38. The chute 14 depends from this horizontal panel. The side panels run from front to back to permit the tray 16 to be stowed between them totally within the housing 27 when the feeder is not in use. That arrangement also permits two trays and chutes for feeding two pets separately at the same time, as shown in FIG. 7. At the center of the horizontal panel 38, there is an integral well 39 into which the end of the spindle 11 is inserted through a hole in a disc 40 covering the well. That hole is just large enough to permit the spindle to be inserted into a recess in the well. In that manner, the spindle is supported and held in a vertical position. A washer 41 over the horizontal panel 38 and disc 39 spaces the storage drum assembly sufficiently away from the horizontal panel to assure that the flange 20 will not drag on the horizontal panel.

As the feed drum turns, the hinged sector panels are held in a horizontal position to close the bottom of the feed bins. As each sector panel reaches a position directly over the chute 14, the sector panel drops to dispense the dry feed in the bin as described hereinbefore. Consequently, it should be noted that the sector panels are held in the horizontal position by the horizontal panel 38 until they reach the feed chute. In order to minimize the drag of each sector panel on the supporting horizontal panel, a small rounded protrusion or button 42 is provided at the outer corner of each sector panel. Each hinged sector panel is thus spaced from the supporting horizontal panel 38 by its protrusion or button 42 to reduce the drag of each sector panel on the supporting horizontal panel.

Figure 4:
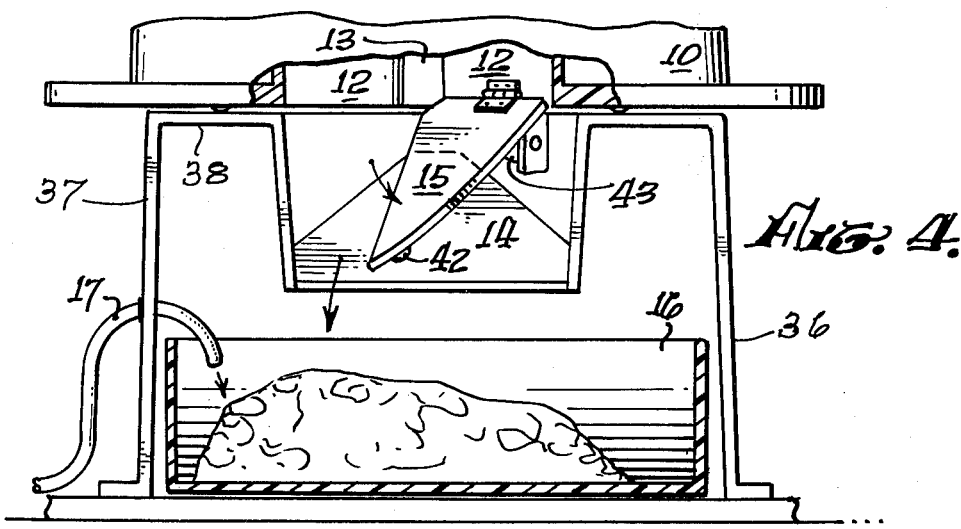
FIG. 4 is a view taken along a line 4—4 of FIG. 3.

Once a sector panel of a bin drops into the chute 14 as shown in FIG. 4, dry feed stored therein drops through the chute 14 into the tray 16. Almost immediately after the sector panel 15 drops into the chute, the now depending sector panel would come in contact with the horizontal panel 38 on the far side of the chute relative to the direction of continued rotation of the drum. To decrease the drag which that would produce on the rotating drum, a small wheel 43 is mounted in the chute 14 on the far side so that the sector panel 15 will not come in contact with the horizontal panel 38. The wheel forces the sector panel 15 back up into its horizontal position with a minimum of drag. Once the sector panel is back in its horizontal position, its button 42 will be in contact with the horizontal panel 38 to maintain that horizontal position with very little drag.

The manner in which water is preheated and dispensed into the tray 16 will now be described with reference to FIG. 3 which shows a metering chamber 45 stowed inside the housing 27, as shown in FIG. 1. A valve 46 is connected to a lever 47 by a rod 48. A cam follower 49 rides on a cam to hold the lever down against the force of a spring 50, and thus hold the drain valve closed, until it is time to dispense water into the tray. At that time, the cam follower 49 moves upwardly under the force of the spring, raising the lever 47 and connecting rod 48 and opening the valve 46. Water will then drain from the metering chamber into the tray 16 through the flexible tube 17 until the water level in the chamber drops to the highest point of the tube 17 draped over the edge of the tray. Immediately after that, the cam follower 49 is again forced downwardly by a cam to force the lever 47 and connecting rod 48 down against the force of the spring 50 and close the valve 46.

The metering chamber is refilled by a float-actuated fill valve 51 from the reservoir 30 through a tube 52. A float 53 rises with the water level to shut the fill valve 51 off when the water has reached a predetermined level. In order that the metering chamber will not start to refill with water from the reservoir until the preheated water in the metering chamber has been drained into the feed tray and the valve 46 is reclosed, a loop 54 on the float 53 is fitted over the end of the lever 47 such that, when the cam follower 49 moves upwardly to raise the lever and open the drain valve 46, the end of the lever 47 will engage the loop and hold the float 53 up while water drains, thus maintaining the fill valve 51 closed. Once the cam follower 49 moves the lever 47 downwardly against the spring 50 to close the drain valve 46, the float 53 will drop to open the fill valve 51. When the metering chamber has refilled to the proper level, and the float has shut the fill valve, the loop 54 from the float 53 will no longer be in contact with the lever 47.

The water metered from the chamber 45 into the tray 16 is preheated by an electrical heater which is turned on through a cam-actuated switch 61 for a short period preceding a feed time, i.e. before the drain valve 46 is opened at the next feed time. A cam follower actuates the switch at the appropriate time in response to cams on the underside of the flange 20. Connected in electrical series with the cam actuated switch 61 is a thermal switch 63 which cuts off electrical current to the heater 60 once the water in the metering chamber 45 has reached a predetermined temperature while the cam actuated switch is on.

FIG. 6 illustrates the timing provided by the cams on the underside of the flange 20 for preheating and draining water from the metering chamber into the tray. Note that the heating cam turns the switch 61 off before the draining cam opens the valve 46. Also notice that the draining cam opens the valve 46 at the same time that a sector panel 15 falls into a feed chute 14. The process of forcing the sector panel 15 back up to the horizontal position begins almost immediately, but substantially all of the dry feed will fall into the feed tray while the draining cam holds the valve 46 open. The horizontal support panel 38 and the wheel 43 cooperate to provide the "bin opening cam" function shown in the timing diagram of FIG. 6.

The diameter of the drain tube 17 is small to permit the water being metered into the tray to flow at a uniform rate for a short period of time while dry feed is falling into the tray. That provides more uniform mixing of the water and the dry feed.

Operation of the heating cam and the draining cam repeats for each cycle of the bin opening cam. Separate timing diagrams have been shown for the bin opening cam during two successive feed times to reflect that two separate and district sector panels are involved in two successive feeding cycles. Since only the relative timing of the various cams is of any concern, the heating and draining cam followers may be positioned anywhere inside the housing 27 in relation to the chute. All that is required is that they be in contact with the underside of the flange 20 and that the cams be positioned relatively to each other to provide the timing of FIG. 6.

Although particular embodiments of the invention have been described and illustrated herein, it is recognized that modifications and equivalents may readily occur to those skilled in the art and consequently it is intended that the claims be interpreted to cover such modifications and equivalents.

The embodiments of the invention in which an exclusive property or privilege is claimed are defined as follows:

1. Apparatus for automatically dispensing pet feed through a chute into a tray on a predetermined schedule from a feed storage drum supported on an elevated plate, to turn on a vertical axis said drum having internal radial panels vertically disposed for dividing the feed storage volume thereof into sectors, each sector being closed at the bottom by a sector-shaped panel to form a storage bin, each sector-shaped panel being hinged on a leading side to open downwardly under gravity for dispensing pet feed into said chute, said chute being connected to said horizontal support plate and having its lower end positioned to empty into said tray, said plate having a sector-shaped opening over said chute of sufficient size to permit each sector-shaped panel to drop in turn into said chute as said drum is rotated, said sector-shaped opening in said support plate having sides spaced to permit only one sector-shaped panel to drop at one time, whereby a sector-shaped panel drops as its trailing side passes into said opening, and thereafter is raised back to its horizontal position as its hinged leading side moves past said opening and over said support plate, and means for continually rotating said drum on said support plate about a vertical axis so as to bring said sector-shaped panels into position over said plate opening in succession, said rotating means being comprised of an annular flange concentrically secured to said drum, a wheel, an electric motor connected to drive said wheel and means for biasing said wheel against the rim of said flange to permit setting the position of said drum, and whereby upon running said motor to turn said drum, each sector-shaped panel drops in turn into said chute when in position over said sector-shaped opening in said panel and each dropped panel is gradually raised into a horizontal position as said drum continues to rotate and thereby force the sector-shaped panel against the far side of the sector-shaped opening.

2. The combination of claim 1 including water metering and dispensing means comprising a water reservoir, a metering chamber drained by a cam-actuated valve and refilled by a float-actuated valve after said metering chamber is at least partially drained into said tray, means for holding said float-actuated valve closed until said cam-actuated valve is closed, and a separate water control cam attached to said annular flange for each bin and a valve actuating cam follower attached to said cam-actuated valve and disposed to ride on said water control cams, said cams being disposed to open said cam-actuated valve through said cam follower each time feed is dispensed in response to rotation of said drum.

3. The combination of claim 2 including water preheating means comprising an electrical heating element in said metering chamber, a switch actuating cam-actuated switch, a cam follower attached to said cam-actuated switch and a separate heat control cam attached to said annular flange for each bin, said cams being disposed for applying electricity to said element for a predetermined period just prior to each hinged sector-shaped panel dropping into said chute heat control.

4. The combination of claim 3 including a thermostat switch connected to said heating element for shutting off electricity to said heating element while water in said metering chamber is above a predetermined temperature.

* * * * *